(12) United States Patent
Kristiansen et al.

(10) Patent No.: US 7,665,014 B2
(45) Date of Patent: Feb. 16, 2010

(54) METHOD AND APPARATUS FOR GENERATING FORMS USING FORM TYPES

(75) Inventors: Freddy Kristiansen, Helsinge (DK); Jens Møller-Pedersen, Allerød (DK); Per Bendsen, Copenhagen (DK); Peter Sloth, Copenhagen V (DK)

(73) Assignee: Microsoft Corporation, Redmond, WA (US)

( * ) Notice: Subject to any disclaimer, the term of this patent is extended or adjusted under 35 U.S.C. 154(b) by 306 days.

(21) Appl. No.: 10/860,226

(22) Filed: Jun. 3, 2004

(65) Prior Publication Data

US 2006/0036634 A1  Feb. 16, 2006

(51) Int. Cl.
*G06F 17/00* (2006.01)
(52) U.S. Cl. ..................... 715/221; 715/225
(58) Field of Classification Search ................. 715/505, 715/506, 507, 508, 221, 222, 223, 224, 225, 715/226
See application file for complete search history.

(56) References Cited

U.S. PATENT DOCUMENTS

| | | | |
|---|---|---|---|
| 5,649,190 A | 7/1997 | Sharif-Askary et al. | |
| 5,999,948 A * | 12/1999 | Nelson et al. | 715/506 |
| 6,012,098 A | 1/2000 | Bayeh et al. | |
| 6,429,882 B1 | 8/2002 | Abdelnor | |
| 6,456,740 B1 * | 9/2002 | Carini et al. | 382/187 |
| 6,580,440 B1 | 6/2003 | Wagner | |
| 6,636,242 B2 | 10/2003 | Bowman-Amuah | |
| 6,657,584 B2 * | 12/2003 | Cavallaro et al. | 342/357.06 |
| 6,704,743 B1 | 3/2004 | Martin | |
| 6,968,500 B2 * | 11/2005 | Mikhailov et al. | 715/221 |
| 7,032,170 B2 * | 4/2006 | Poulose et al. | 715/222 |
| 7,194,683 B2 | 3/2007 | Hind | |
| 7,469,378 B2 * | 12/2008 | Nagahara et al. | 715/243 |
| 7,584,416 B2 * | 9/2009 | Beran et al. | 715/222 |
| 2002/0030625 A1 * | 3/2002 | Cavallaro et al. | 342/357.06 |
| 2002/0083068 A1 * | 6/2002 | Quass et al. | 707/100 |
| 2002/0091732 A1 * | 7/2002 | Pedro | 707/505 |
| 2002/0105548 A1 | 8/2002 | Hayton et al. | |
| 2002/0111922 A1 * | 8/2002 | Young et al. | 705/80 |
| 2003/0025732 A1 | 2/2003 | Prichard | |
| 2003/0058277 A1 | 3/2003 | Bowman-Amuah | |
| 2003/0131142 A1 * | 7/2003 | Horvitz et al. | 709/313 |
| 2003/0135825 A1 * | 7/2003 | Gertner et al. | 715/513 |
| 2003/0188260 A1 * | 10/2003 | Jensen et al. | 715/505 |
| 2003/0221162 A1 | 11/2003 | Sridhar | 715/501.1 |
| 2003/0221165 A1 * | 11/2003 | Young et al. | 715/505 |

(Continued)

OTHER PUBLICATIONS

Lehtonen et al., A Dynamic User Interface for Document Assembly, ACM 2002, pp. 134-141.*

(Continued)

*Primary Examiner*—Cong-Lac Huynh
(74) *Attorney, Agent, or Firm*—Westman, Champlin & Kelly, P.A.

(57) ABSTRACT

A method, computer readable medium and system are provided which generate model driven forms that represent data models. Using the method, to generate a form that represents a data model, such as a business model, a selection is made to identify which of a plurality of different logical form types is to be used to generate the form to represent the data model. Then, a logical form is generated at run-time using the data model and the selected logical form type.

23 Claims, 8 Drawing Sheets

U.S. PATENT DOCUMENTS

| | | | |
|---|---|---|---|
| 2004/0039990 A1* | 2/2004 | Bakar et al. | 715/505 |
| 2004/0083426 A1 | 4/2004 | Sahu | |
| 2004/0197029 A1* | 10/2004 | Brundage et al. | 382/306 |
| 2004/0205525 A1* | 10/2004 | Murren et al. | 715/505 |
| 2004/0205534 A1* | 10/2004 | Koelle | 715/507 |
| 2004/0237030 A1* | 11/2004 | Malkin | 715/505 |
| 2004/0249664 A1 | 12/2004 | Broverman et al. | 705/2 |
| 2004/0268240 A1 | 12/2004 | Vincent | 715/513 |
| 2005/0005259 A1 | 1/2005 | Avery et al. | |
| 2005/0027620 A1* | 2/2005 | Taylor et al. | 705/28 |
| 2005/0065777 A1* | 3/2005 | Dolan et al. | 704/10 |
| 2005/0234688 A1* | 10/2005 | Pinto et al. | 703/6 |
| 2006/0004845 A1* | 1/2006 | Kristiansen et al. | 707/103 R |
| 2006/0026522 A1* | 2/2006 | Bendsen et al. | 715/705 |
| 2006/0031757 A9 | 2/2006 | Vincent | 715/513 |
| 2006/0235764 A1* | 10/2006 | Bamborough et al. | 705/26 |

OTHER PUBLICATIONS

Zdun, Dynamically Generating Web Application Fragemnts from Page Templates, ACM 2001, pp. 1113-1120.*

Budzikowska et al., Conversaitonal Sales Assistant for Online Shopping, ACM Mar. 2001, pp. 1-2.*

Bendsen, Model-Driven Business UI Based on Maps, ACM 2004, pp. 887-891.*

Ram et al., Collaborative Conceptual Schema Design: A Process Model and Prototype System, ACM 1998, pp. 347-371.*

Bettin, J., "Model-Driven Architecture Implementation & Metrics", SoftMetaWare,Ltd., Version 1.1, Aug. 28, 2003.

Lämmel et al., R., "Maping a Conceptual to a Relational Schema", Feb. 16, 2004.

Baxley, B., "Universal Model of a User Interface", http://www.aiga.org/resources/content/9/7/8/documents/baxley.pdf, at least by Apr. 26, 2004.

Karsai et al., G. "Graph Transformations In OMG's Model-Driven Architecture", http://www.isis.vanderbilt.edu/ publications/archive/Karsai_G_12_0_2003_Graph_Tran.pdf, at least by Apr. 26, 2004.

Balasubramanian et al., K. "Model Driven Middleware: A New Paradigm for Developing and Provisioning Distributed Real-time and Embedded Applications", Science of Computer Programming, Nov. 14, 2003.

"Unify NXJ Forms Processing—Application Development using Unify NXJ Application Designed" NXJ Technical White Paper, at least by Apr. 26, 2004.

Kobro et al., R. "What is Model Driven Architecture?" University of Oslo, Research Report 304, ISBN 82-7368-256-0, ISSN 0806-3036, Mar. 2003.

"User Interface Markup Language (UIML) Draft Specification) Draft Specification", Harmonia, Inc., Jan. 17, 2004.

Bernstein, P.A., "Applying Model Management to Classical Meta Data Problems", Proceedings CIDP 2003, pp. 209-220, 2003.

Microsoft, "BizTalk Server 2004 Architecture—White Paper", Dec. 2003.

Microsoft Business Solutions, Microsoft Business Solutions-Axapta 3.0 Overview, Jul. 2003. http://microsoft.com/businessSolutions/axapta/.

Microsoft Developers Network (MSDN), Avalon, 2003. http://msdn.microsoft.com/longhorn/understanding/pillars/avalon.

Office Action dated Jun. 28, 2006 for U.S. Appl. No. 10/860,225, filed Jun. 3, 2004.

Office Action dated Jul. 12, 2006 for U.S. Appl. No. 10/860,306, filed Jun. 3, 2004.

"XSL Transformations", Wikipedia, http://en.wikipedia.org/wiki/XSL_Transformations, last modified Nov. 27, 2006.

Office Action dated Dec. 21, 2006 for U.S. Appl. No. 10/860,225, filed Jun. 3, 2004.

Search Report dated Nov. 9, 2007 from related European Patent Application No. 05104721.5.

Third Chinese Official Action, 2009.

* cited by examiner

METHOD AND APPARATUS FOR GENERATING FORMS USING FORM TYPES

CROSS-REFERENCE TO RELATED APPLICATIONS

Reference is hereby made to the following co-pending and commonly assigned patent applications: U.S. application Ser. No. 10/860,306, filed Jun. 3, 2004, entitled "METHOD AND APPARATUS FOR GENERATING USER INTERFACES BASED UPON AUTOMATION WITH FULL FLEXIBILITY" and U.S. application Ser. No. 10/860,225, filed Jun. 3, 2004, entitled "METHOD AND APPARATUS FOR MAPPING A DATA MODEL TO A USER INTERFACE MODEL", both of which are hereby incorporated by reference in their entirety.

BACKGROUND OF THE INVENTION

The present invention relates to the generation of forms. More particularly, the present invention relates to methods and apparatus for generating and updating forms or form user interfaces (UIs).

In typical business software products and applications, such as enterprise resource planning (ERP) products, a large number of forms or form user interfaces are used. A form is a window, a dialog, a page, or another UI element for viewing and/or entering data. It is not uncommon for the number of forms which are used in conjunction with a business software application to exceed several thousand. Developing a large number of forms has traditionally been a labor-intensive task for software developers.

Traditionally, in generating the large number of forms required for some business or other types of software applications, software developers have created each of the forms separately and somewhat independently. In order to achieve a certain degree of consistency between forms, developers have frequently adhered to some type of standards which dictated the general layout of the forms. These standards for the forms have been implemented as "best practice" or preferred implementations. While software developers can reply upon best practices for guidance in determining how a particular form should look, even with best practices, the developers face the labor intensive task of creating each of the many different forms largely independently of each other.

Another difficulty which both software developers and customers or users face relates to the labor intensive task of updating forms when needed. Traditionally, if a form was based on a particular business model, changes to the business model would require that the developer change the form associated with the business model separately. Further, if a large number of forms corresponded to the same business model, changes to the business model would require that each of the corresponding forms be updated as well. Also, any time the layout or the contents of a large number of forms was desired to be changed, each of the large number forms were revised independently. Thus, these difficulties made it a labor-intensive task for software developers to create a large number of forms, and likewise made it difficult for customers or users of the software applications to make changes to the business model and forms themselves.

The present invention provides solutions to one or more of the above-described problems and/or provides other advantages over the prior art.

SUMMARY OF THE INVENTION

A method, computer readable medium and system are provided which generate model driven forms that represent data models or models of a problem domain. Using the method, to generate a form that represents a data model, such as a business model, a selection is made to identify which of a plurality of different logical form types is to be used to generate the form to represent the data model. Then, a logical form is generated at run-time using the data model and the selected logical form type. The form is then also rendered at run-time using the generated logical form such that the data model is acted on at run-time.

In some embodiments, selecting which of the plurality of different logical form types to use to generate the form further comprises selecting which of a plurality of different logical form type models to use to generate the user interface. Then, generating the logical form at run-time comprises generating the logical form at run-time using both the selected logical form type model and meta data from the data model.

In some embodiments, each of the plurality of different logical form types has an associated schema which defines data model data to be included in the generated logical form. The schema of each different logical form type represents patterns captured from a plurality of forms. In these embodiments, generating the logical form at run-time further comprises generating the logical form using the associated schema.

Other features and benefits that characterize embodiments of the present invention will be apparent upon reading the following detailed description and review of the associated drawings.

DETAILED DESCRIPTION OF ILLUSTRATIVE EMBODIMENTS

Figure 1:
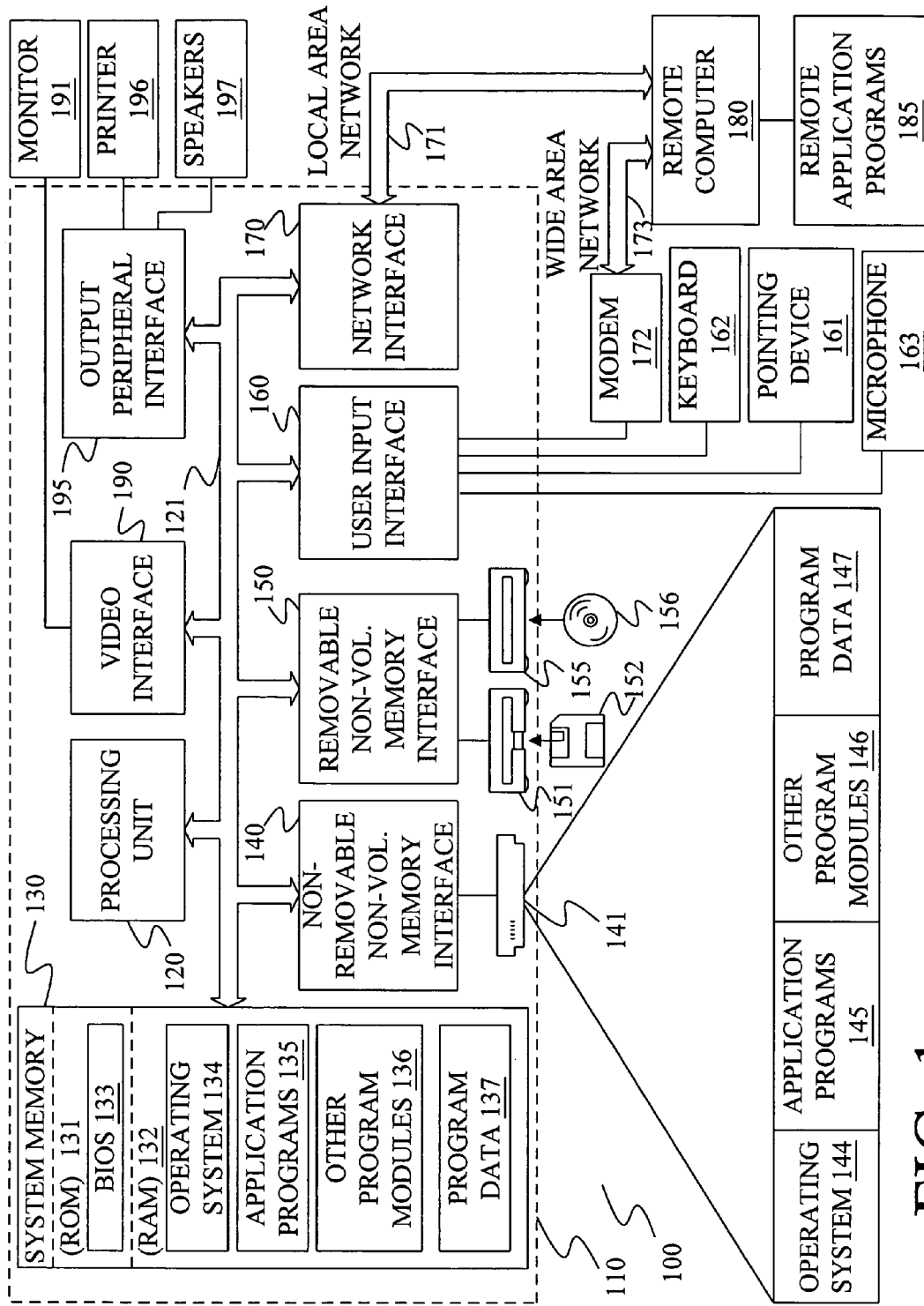
FIG. 1 is a block diagram of one exemplary environment in which the present invention can be used.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137. A particular group of application programs are called business applications. These are targeted at the management of companies including—but not limited to—handling the general ledger, inventory, salaries, customers, sales, purchases, financial reports and any other data relevant for a business.

The computer 110 may also include other removable/non-removable volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies.

A user may enter commands and information into the computer 110 through input devices such as a keyboard 162, a microphone 163, and a pointing device 161, such as a mouse, trackball or touch pad. Other input devices (not shown) may include a joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). The input devices are used for creating, modifying, and deleting data. Input devices can also be used for controlling (starting and stopping) the application programs and particular functions herein. The functions include opening (showing) forms and closing the forms. A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195. The monitor or other display device is used to show (render) forms.

The computer 110 may operate in a networked environment using logical connections to one or more remote computers, such as a remote computer 180. The remote computer 180 may be a personal computer, a hand-held device, a server, a router, a network PC, a peer device or other common network node, and typically includes many or all of the elements described above relative to the computer 110. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on remote computer 180. It will be appreciated that the network connections shown are exemplary and other means of establishing a communications link between the computers may be used.

Figure 2:
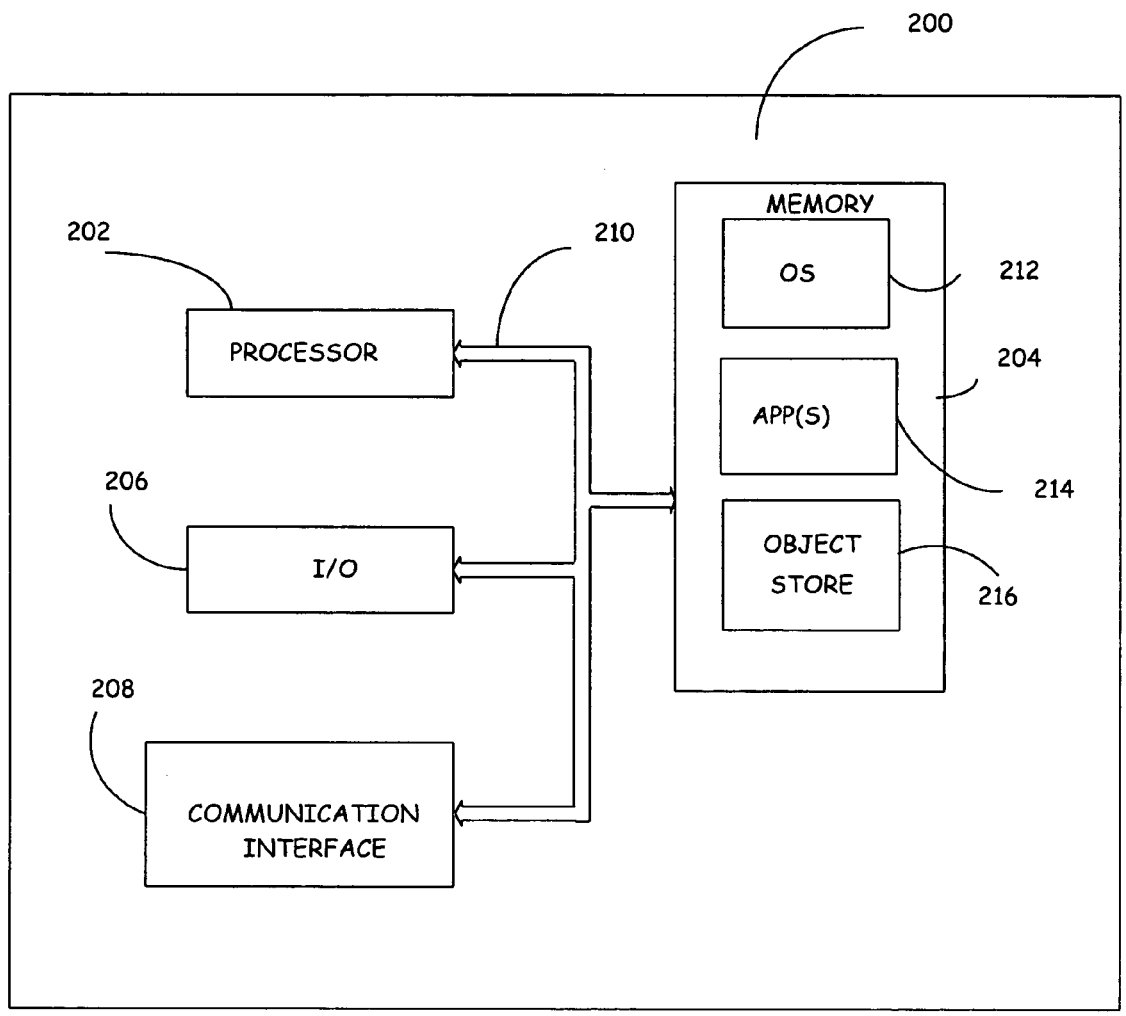
FIG. 2 is a block diagram of a general mobile computing environment in which the present invention can be implemented.

FIG. 2 is a block diagram of a mobile device 200, which is an alternative exemplary computing environment. Mobile device 200 includes a microprocessor 202, memory 204, input/output (I/O) components 206, and a communication interface 208 for communicating with remote computers or other mobile devices. In one embodiment, the afore-mentioned components are coupled for communication with one another over a suitable bus 210.

Memory 204 is implemented as non-volatile electronic memory such as random access memory (RAM) with a battery back-up module (not shown) such that information stored in memory 204 is not lost when the general power to mobile device 200 is shut down. A portion of memory 204 is preferably allocated as addressable memory for program execution, while another portion of memory 204 is preferably used for storage, such as to simulate storage on a disk drive.

Memory 204 includes an operating system 212, application programs 214 as well as an object store 216. During operation, operating system 212 is preferably executed by processor 202 from memory 204. Operating system 212, in one preferred embodiment, is a WINDOWS® CE brand operating system commercially available from Microsoft Corporation. Operating system 212 is preferably designed for mobile devices, and implements database features that can be utilized by applications 214 through a set of exposed application programming interfaces and methods. The objects in object store 216 are maintained by applications 214 and operating system 212, at least partially in response to calls to the exposed application programming interfaces and methods.

Communication interface 208 represents numerous devices and technologies that allow mobile device 200 to send and receive information. The devices include wired and wireless modems, satellite receivers and broadcast tuners to name a few. Mobile device 200 can also be directly connected to a computer to exchange data therewith. In such cases, communication interface 208 can be an infrared transceiver or a serial or parallel communication connection, all of which are capable of transmitting streaming information.

Input/output components 206 include a variety of input devices such as a touch-sensitive screen, buttons, rollers, and a microphone as well as a variety of output devices including an audio generator, a vibrating device, and a display. The devices listed above are by way of example and need not all be present on mobile device 200. In addition, other input/output devices may be attached to or found with mobile device 200.

Form Types

The present invention utilizes the concepts of logical forms and logical form types to provide a new method of building forms or form user interfaces for business and other applications. While in exemplary embodiments or implementations of the invention logical forms and logical form types are used, the use of the logical layer is not required in all embodiments. Thus, the present invention applies to the use of form types to create forms in general. Business applications of today typically consists of a large number of forms which often fall into a few categories or follow a similar pattern. Investigations show that the 1800 forms found in Microsoft Business Solutions Axapta can be divided into only 7 categories.

The form types of the present invention, which can be models used to aid in the generation of forms, support the notion of model-driven forms or form user interfaces by preserving and acting on the business or data model both at design-time and at run-time. This provides a high level of abstraction to a software developer. Further, the use of form types in accordance with the present invention ensures re-use (one layout is used many times), a much more homogeneous set of forms since all forms fall into a few distinct types, and forms that are easier to maintain (the layout of the type can be changed without changing the form and in some instances a different type can be applied without changing the form). It should be noted that, in certain embodiments, some form types can be incompatible, and changing the form type can require a recompile or a complete rebuild of the form. The invention ensures that application developers can reuse the user interface model across multiple display targets while retaining complete control of the look and feel of the application and how navigation within the application takes place on each display target. Examples of display targets include each of the multiple types of current and future operating systems, as well as each of the many available or future mobile devices. As another example, each rendering technology on a particular operating system can also be a display target.

Using the concepts of the present invention, a logical form contains display target independent logical controls, which makes the logical form independent of display targets itself. A logical form refers to a logical form type which defines the pattern that the logical form must follow. The logical form type referred to by a logical form can be selected from multiple different logical form types to quickly establish the look and contents of the logical form. In embodiments of the present invention, the logical form types are models that, when combined with a business or other data model, results in the generation of a logical form.

In some embodiments, the logical form type exposes the schema (which describes the structure of the form, which elements it can contain, etc.) that the form must conform to, the Maps (or Rules) which map (automatically or manually via an application developer) the business model to the logical model and from this to the physical model. In another embodiment (not using the schemas) the form types are themselves forms which define a certain structure which the form can extend. The form type may also contain user interface logic (code) that affect the dynamic behavior of the logical form and its contents. Further, a form type may reference display target information or contain display target specific meta data. Hence, form types expose style and layout information, and other types of information specific to a display target. However, since they also specify rules for the logical form and its contents they play a much bigger role. Certain aspects of the form types of the present invention are introduced as follows:

Different Form Types

As mentioned, in a typical use of the present invention, multiple different form types are provided for use by an application developer in creating forms. For example, in one example embodiment, form types could include a Dialog form type, a Card or CardView form type, a ListView form type, an EntityOverview form type, and an ActivityCenter form type. These form types correspond to typical different categories of forms used in a business application in one example. Thus, providing the multiple form types allows application developers to build all the forms that make up a state-of-the-art business application. As will be understood by those of skill in the art, these particular form types are simply an example, and the present invention is not limited to any particular form types or to any particular number of form types.

Form Type Layout

The contents and structure of the layout information may be different for each form type. Further, the layout information may be display target specific. For instance, the layout information for the ActivityCenter form type could have support for Themes/Skins/Styles and Master Pages which will be used by the HTML (i.e., World Wide Web or Internet) display target for displaying the form on a particular operating system platform. This gives the business developer the freedom to innovate on different display targets and tweak the form as much as needed. In the special case where only one display target is targeted, and if therefore the logical layer is omitted, the Form Type and Form Type Layout could be the same.

Pluggable and Extensible

Form types offer full flexibility and extensibility as an independent software vendor (ISV) can modify or extend them and create new form types, thereby changing the look and feel for the entire application. The form type may also define which physical controls to use on a given display target. For example, a form type may allow a standard grid to be substituted with a third party grid control (if the third party grid satisfies a well-defined contract/interface). The controls to use can be defined in a map (which may differ between form types)—and hence they are late bound—so controls can be substituted without the need for a recompilation—i.e. after deployment.

Figure 3:
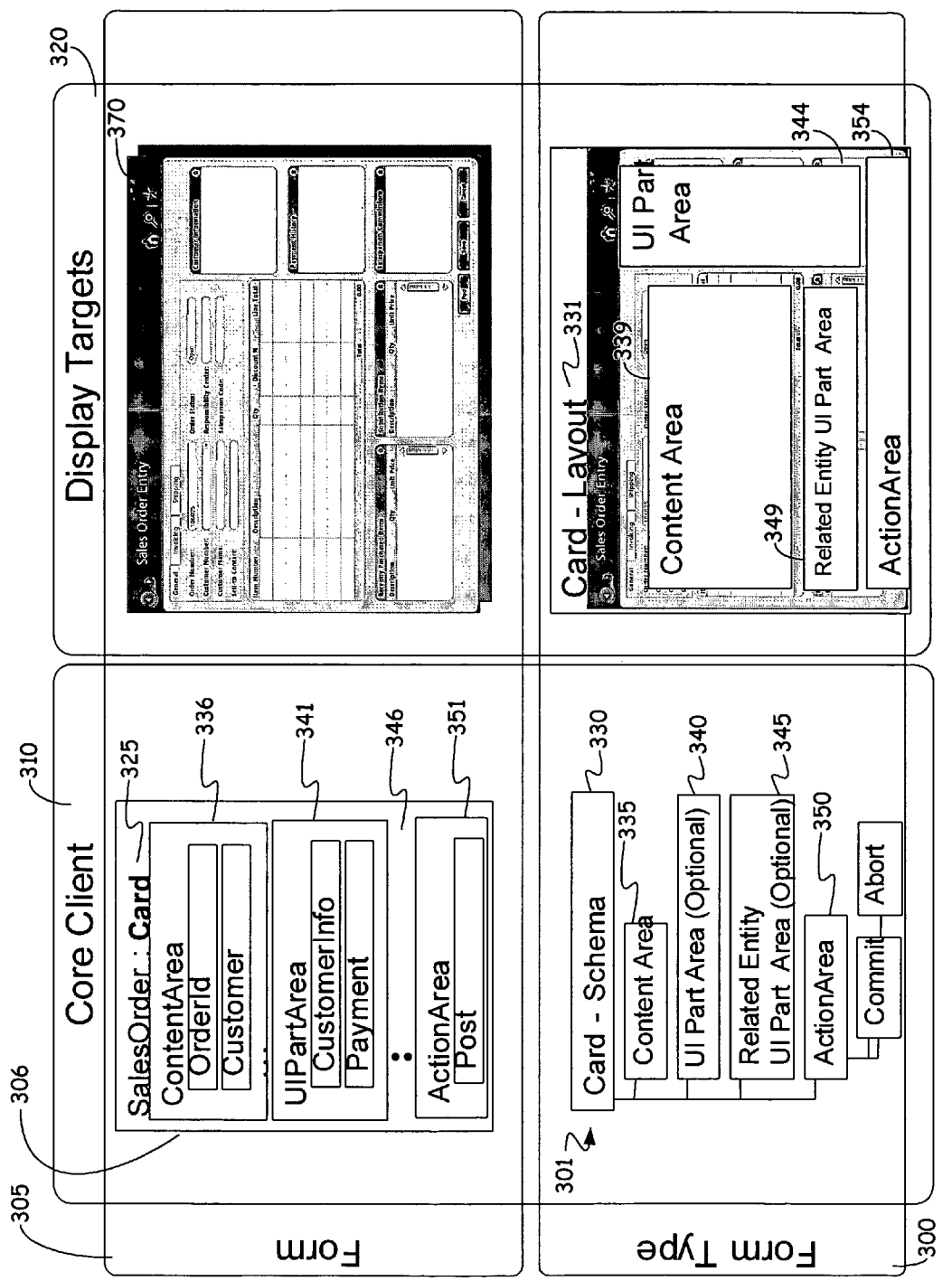
FIG. 3 is a diagrammatic illustration of the use of form types of the present invention to generate logical forms and physical forms.
Figure 4:
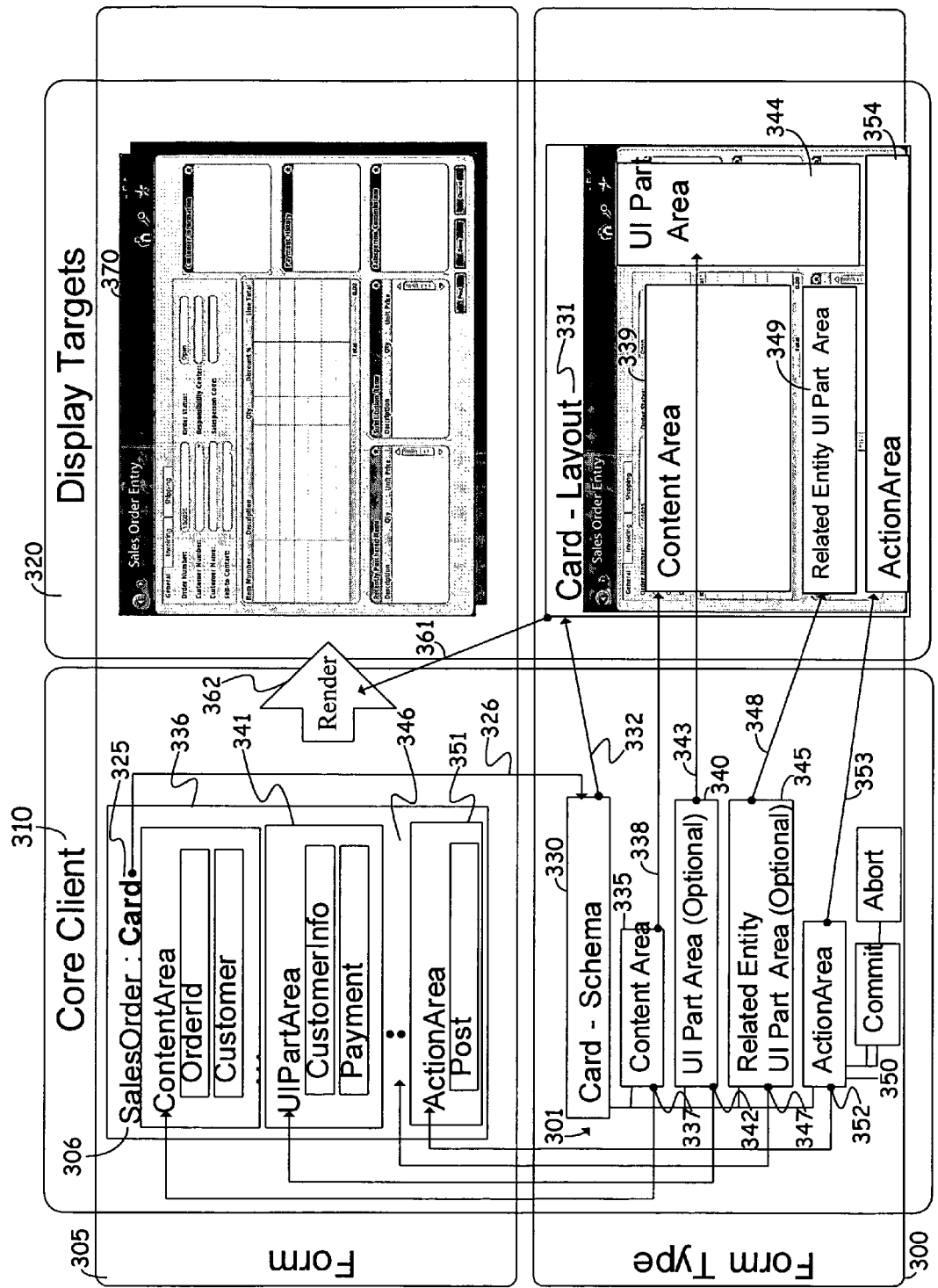
FIG. 4 is a diagrammatic illustration of the use of form types as shown in FIG. 3, and further illustrating the relationship between form types and the generation of logical forms and physical forms.

Referring now to FIGS. 3 and 4, shown are diagrammatic illustrations of a Sales Order logical form created using a Card form type in accordance with an example embodiment of the present invention. In this example, the Sales Order logical form contains a set of logical controls grouped into three different logical control groups. As will be described further below, the Card form type defines how and where the controls will appear on the physical form and on different display targets, and which physical controls to use for rendering. FIGS. 3 and 4 illustrate the same information, with FIG. 4 including arrows illustrating relationships and origins of information between the logical form type and the logical form, and the generation of a physical form from the logical form.

FIGS. 3 and 4 diagrammatically illustrate a form instance 305 generated using a form type 300. On a core client 310, which is a display target independent forms engine, form instance 305 is logical form 306 (shown as a conceptual model of a form) and form type 300 is a logical form type 301. On a display target 320, form 305 is a rendered form 370 created using logical form 306, and ultimately from logical form type 301. Rendered form 370 is one particular implementation, but many other implementations or renderings can be achieved. The rendered form 370 can also be referred to as a physical form.

Two parts included in form type 300 include a schema 330 that defines what has to be included in particular forms using the form type, and a layout 331 that includes controls which specify how the form should be rendered or drawn on a specific display target. The form type also contains a mapping from logical to physical controls, which can also be considered to be part of the layout 331 in some embodiments. The form type may also include logic determining the interaction between UI elements (controls, etc.). This logic is display target independent, so the schema also includes "code-behind". By having different layouts which can be used by a form type, the forms created using the form type can be tailored to different display targets (e.g., cell phone displays, personal digital assistant displays, personal computer monitors, etc.). With form type 300 representing a captured pattern to be used in multiple forms, multiple form instances 305 can be generated using form type 300.

Consider for this example a process that a developer could go through to create a form for a Sales Order entity or object model (i.e., the business or data model). First, the developer could look to see which kinds of forms he or she has to choose from. Selecting the "Card" form type, as shown at 325 in FIGS. 3 and 4, calls up or designates the Card Schema 330 as is represented by arrow 326 in FIG. 4.

When the developer specifies a particular form type and associated schema, he or she is in some embodiments choosing to include in the form the information or fields dictated by the schema, with meta data from the user's business or other model populating the field values. In some embodiments the form types can include a pattern for navigating between forms—the form type defines how another form (of a given type) is opened—e.g. in its own window or replacing the content area. For example, by selecting the Card form type 301 (and associated Card schema 330), the logical form 306 will include a Content Area 336 corresponding to Content Area 335 defined in the schema 330. The origin of Content Area 336 corresponding to Content Area 335 is represented by arrow 337 in FIG. 4. Likewise, because the schema 330 of the Card form type includes a UI Part Area 340, a Related Entity UI Part Area 345, and an Action Area 350, the logical form 306 includes these areas or fields as well as shown at 341, 346 and 351. Again, the origins of these fields are represented diagrammatically by arrows 342, 347 and 352.

As mentioned above, each form type also includes a layout 331 that dictates which controls to use for rendering on a specific display target. As shown diagrammatically in FIGS. 3 and 4, the layout for the card form type includes controls which cause a display target 320 to include a Content Area 339, a UI Part Area 344, a Related Entity IU Part Area 349, and an Action Area 354. Arrows 338, 343, 348 and 353 illustrate the correlation of these areas in the card layout to their corresponding areas in the Card schema. The logical form 306, which is generated using the selected logical form type and meta data from the data model (in this example a Sales Order entity), is rendered as a physical form 370 on display target 320 This process is illustrated in FIG. 4 using arrows 361 and 362.

Figure 5:
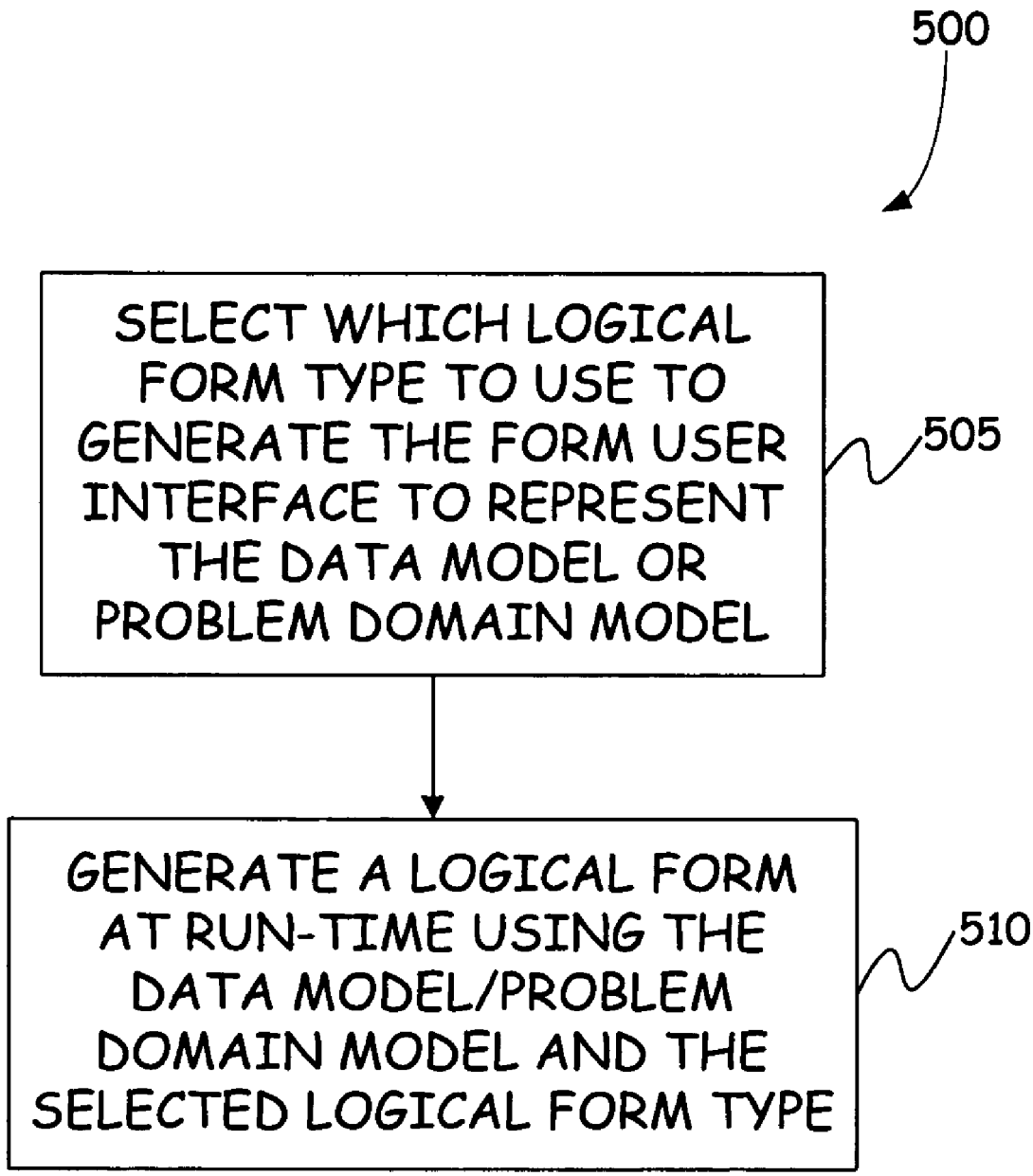
FIG. 5 is a flow diagram illustrating a method for generating forms using form types in accordance with embodiments of the present invention.

Referring now to FIG. 5, shown is a flow diagram 500 which illustrates a method of generating a model driven form to represent a data model as was described above with reference to FIGS. 3 and 4. At step 505, the method is shown to include selecting which of multiple different logical form types to use to generate the form to represent the data model. In the example provided above, a Card or CardView form type was selected for this purpose. Then, at step 510, the method includes generating a logical form at run-time using the data model and the selected logical form type. By generating the logical form at run-time, the data model is preserved (i.e., acted on at run-time), and any changes made to the data model will be reflected in the logical form and in the rendered physical form. Since in some embodiments the form types can be considered logical form type models, the step 510 can be considered to include generating the logical form at run-time using both the selected logical form type model and meta data from the data model.

As described above, each of the multiple different logical form types has an associated schema which defines data from the data model to be included in the generated logical form. Therefore, the step 510 of generating the logical form at run-time includes generating the logical form using the associated schema in exemplary embodiments. Since the schema of each of the different logical form types represents patterns captured from a large number of forms, a few form types can be used to generate a very large number of forms. Also, since each of the logical form types has at least one defined layout which is specific to a particular display target, a step of generating a physical form at run-time includes generating the physical form using the at least one defined layout. In other embodiments, each logical form type can include multiple different layouts corresponding to multiple different display targets to facilitate generation of a large number of forms for the different display targets.

Figure 6:
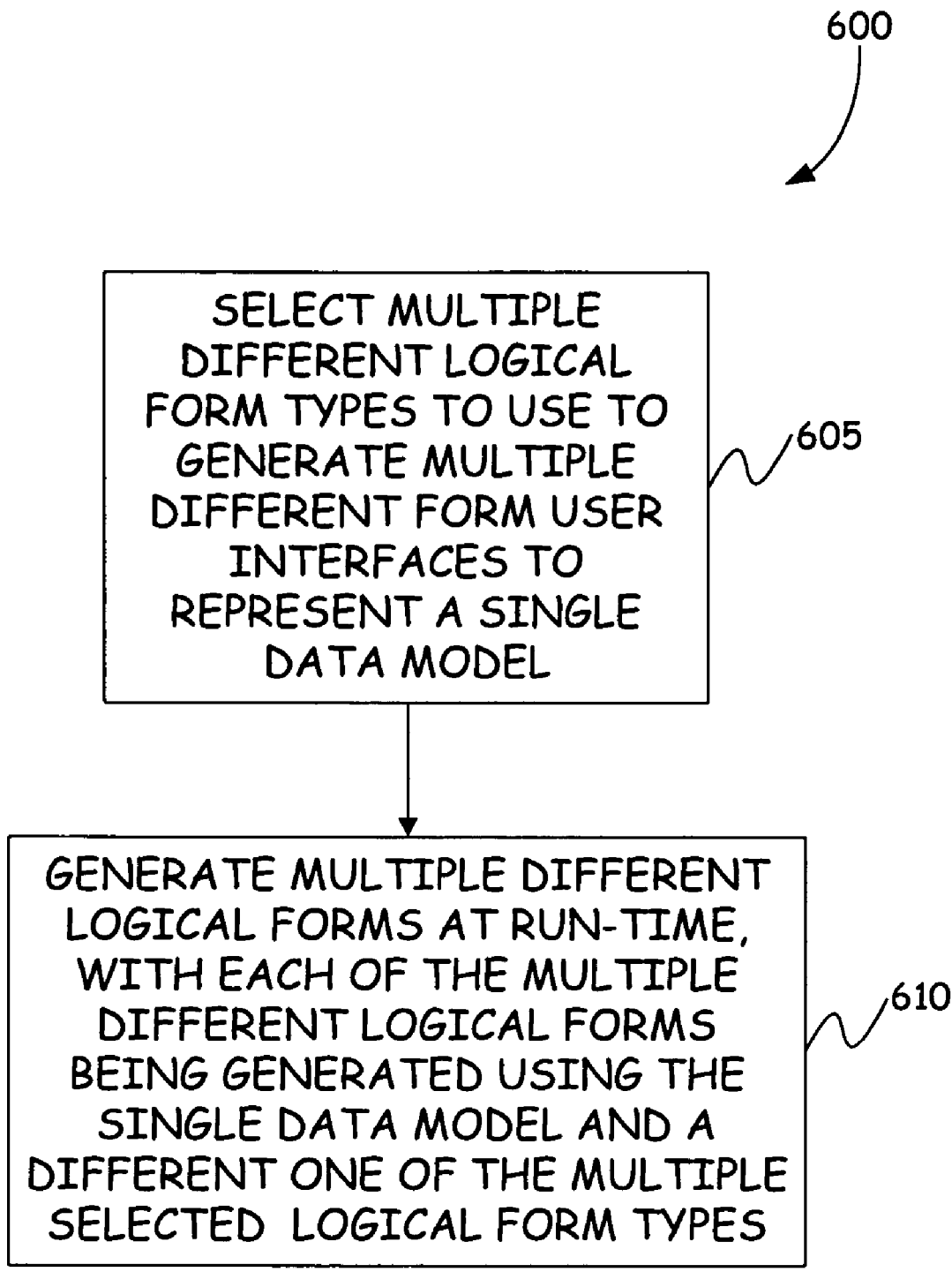
FIG. 6 is a flow diagram illustrating a more particular embodiment of the method shown in FIG. 5.

In some embodiments of the invention, the methods disclosed herein generate multiple different forms that represent a single data model. For example, consider the method steps illustrated in flow diagram 600 shown in FIG. 6. Here, the method is shown to further include the step 605 of selecting multiple different logical form types to use to generate the multiple different forms that represent the data model. Then, as shown at step 610, the method includes generating the multiple different logical forms at run-time, with each of the different logical forms being generated using the data model and a different one of the selected logical form types. In accordance with an aspect of the present invention, since the data model is acted upon at run-time, this allows changes to the data model to be implemented in multiple generated forms automatically. Altering the data model a single time, but automatically affecting multiple forms at run-time provides a significant increase in efficiency as compared to conventional more labor intensive methods of generating forms.

Figure 7:
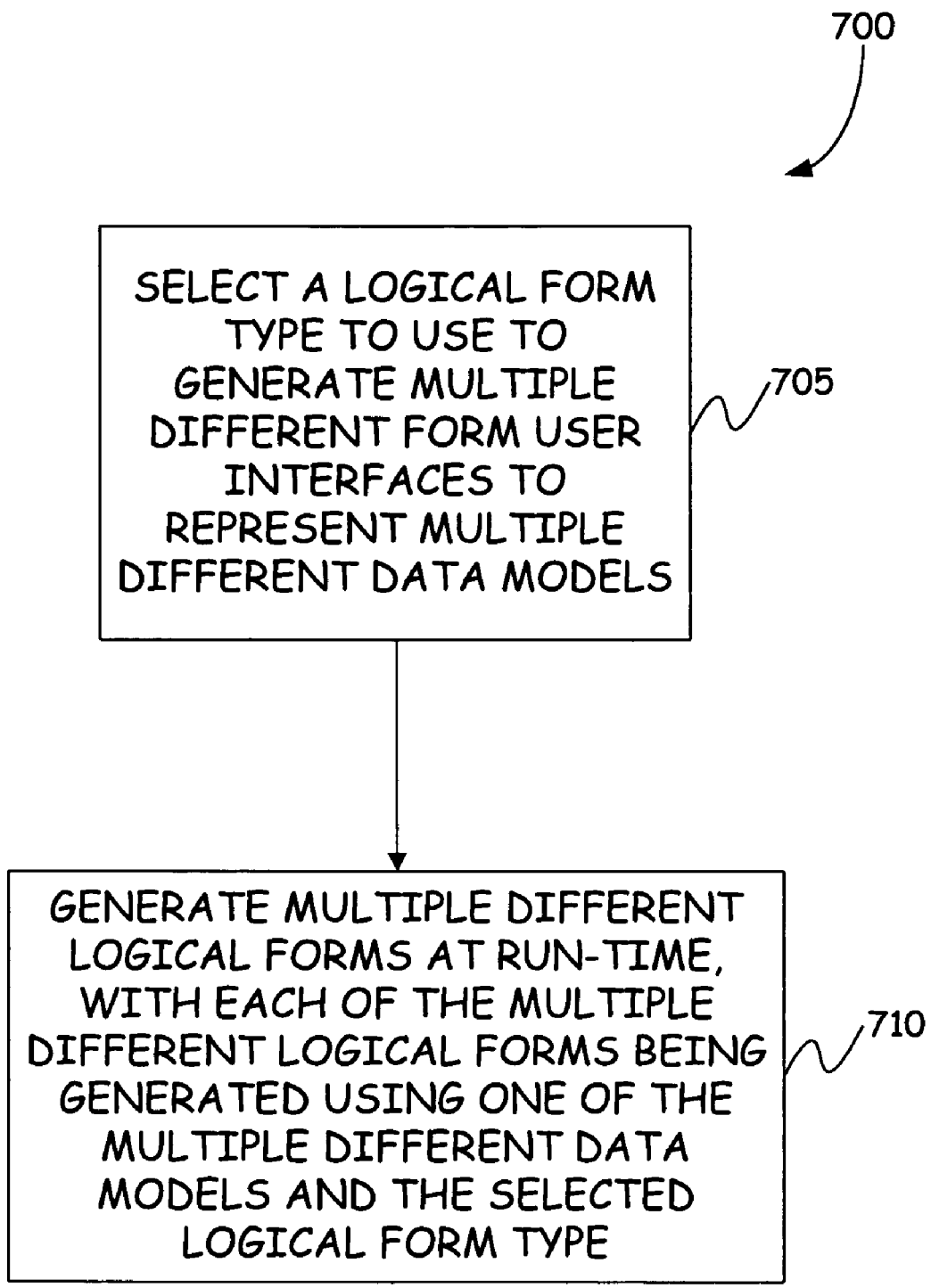
FIG. 7 is a flow diagram illustrating a more particular embodiment of the method shown in FIG. 5.

In still other embodiments, the methods of the present invention are used to generate multiple different model driven forms that represent multiple different data models. For example, consider the method steps illustrated in flow diagram 700 shown in FIG. 7. At step 705, this more particular embodiment of the method includes selecting which one of multiple different logical form types to use to generate multiple different forms to represent the data models. Then, at step 710, the method is shown to include generating multiple different logical forms at run-time, with each of the multiple different logical forms being generated using one of the multiple different data models and the selected logical form type. Thus, single form can be used to generate a logical form for each of a large number of data model.Since the multiple different forms are rendered at run-time using the generated logical forms, the data models are still acted on at run-time. As an efficiency enhancement, each of the multiple different forms can be altered by altering the one selected logical form type a single time.

Figure 8:
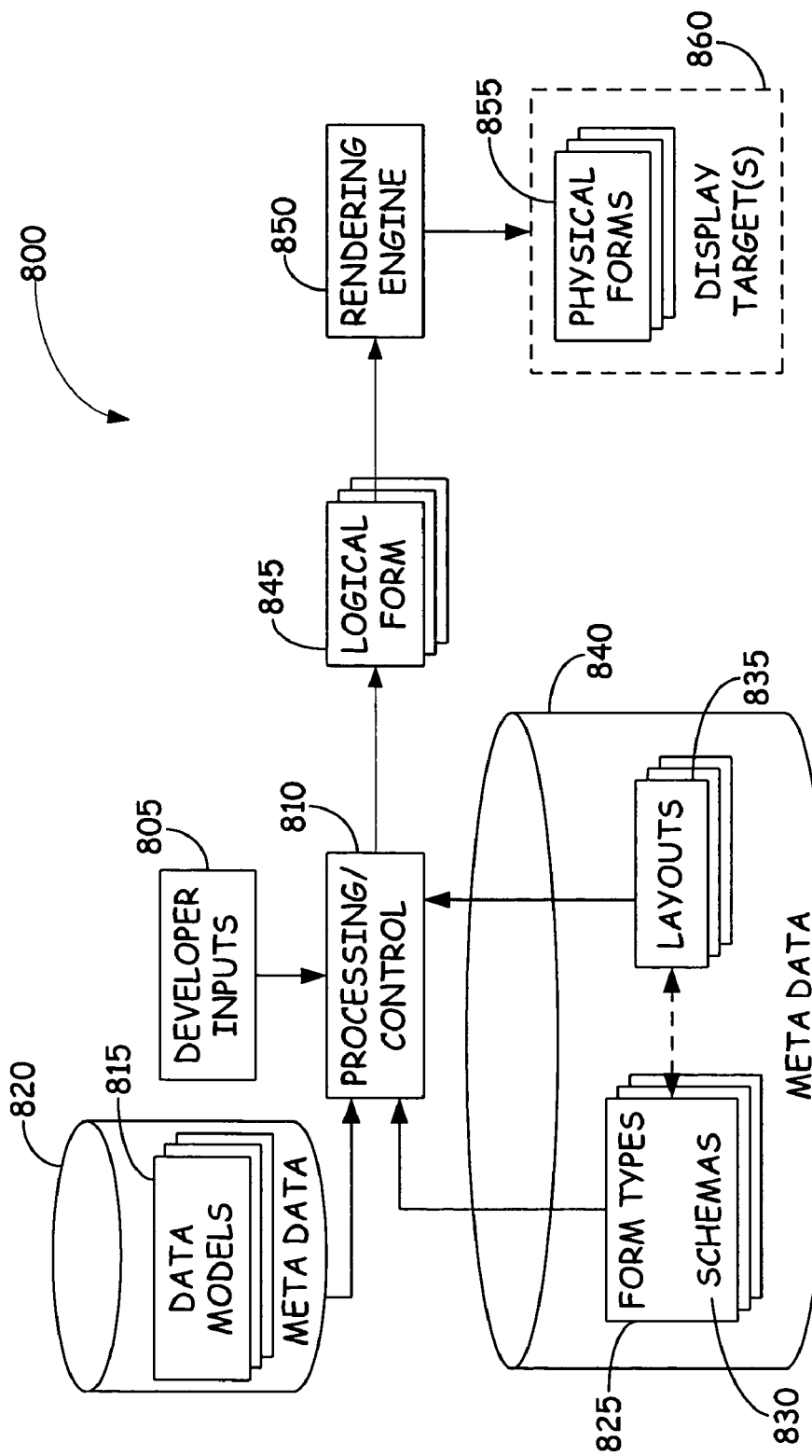
FIG. 8 is a block diagram illustrating a system or apparatus for generating forms using form types in accordance with embodiments of the present invention.

Referring now to FIG. 8, shown is a block diagram of a system 800 for generating model driven forms that represent data models. As shown in FIG. 8, system 800 includes processing/control component 810 and data stores 820 and 840 for storing meta data related to either the data models 815 (for example business models in the form of entities or objects) or for storing form types 825 and associated schemas 830 and layouts 835. Developer inputs 805 can be, but is not restricted to, any inputs which select form types and data models to be used to generate logical forms 845. For example, any of the input devices described with reference to FIGS. 1 and 2 can be used to provide these inputs. Example input actions can include selecting, from a list or otherwise, which form type to use. The developer inputs can also include input actions such as dragging a visual representation of the data model onto a visual representation of the selected form type in order to dictate which field types the generated logical form should include. Many other developer inputs can also be used.

Logical form types can also be used by third parties to customize the form types at runtime, which is not necessarily considered to be selecting data models or form types. Therefore, developer input is not necessarily restricted to "design time". Further, the methods of the present invention are not restricted to embodiments requiring developer input. In other embodiments, the form types can be personalized—allowing the end user to change multiple forms at once.

With the form type 825 and associated schema 830 and layout 835 selected, along with a particular data model, processing/control component 810 is configured to generate logical forms 845 as described above. Then, a rendering engine 850 generates the physical forms 855 and the corresponding display target(s) 860.

Although the present invention has been described with reference to particular embodiments, workers skilled in the art will recognize that changes may be made in form and detail without departing from the spirit and scope of the invention.

What is claimed is:

1. A method for rendering a form of a selected form type on multiple different types of display targets, comprising:
    selecting, using a processor, which of a variety of different data models and which of a plurality of different form types to use to render the form;
    identifying, using the processor, a schema associated with the selected form type, the schema including a plurality of fields corresponding to the data model associated with the form type;
    selecting, using the processor, fields from the plurality of fields based on preference;

determining, using the processor, meta data associated with the selected fields;

identifying, using the processor, multiple layouts, from a plurality of layouts associated with the schema, each of the plurality of layouts specifying how the form is to be rendered on different display targets, the identified multiple layouts including a plurality of interface areas, each interface area corresponding to one of the selected fields; and rendering the form on multiple different display targets using the multiple identified layouts and the determined meta data.

2. The method of claim 1, wherein the data model is a business model.

3. The method of claim 1, wherein rendering the form on multiple different display targets further comprises generating and modifying the form at a design-time, and filling the generated form with data from the data model at a run-time.

4. The method of claim 1, wherein rendering the form further comprises generating at least one logical form using the data model and the selected logical form type.

5. The method of claim 4, and further comprising rendering the form using the at least one generated logical form.

6. The method of claim 5, wherein rendering the form further comprises rendering multiple instances of the form at run-time using the at least one generated logical form such that the data model is acted on at run-time.

7. The method of claim 1, wherein the schema associated with the form type represents patterns captured from a plurality of forms.

8. The method of claim 1, wherein the method further renders a plurality of different model driven forms representing the data model, the method comprising:

selecting multiple ones of a plurality of different logical form types to use to generate a plurality of different forms representing the data model; and rendering the plurality of different forms, wherein each of the plurality of different forms is generated using the data model and a different one of the selected multiple ones of the plurality of different logical form types.

9. The method of claim 8, and further comprising rendering the plurality of different forms at run-time such that the data model is acted on at run-time.

10. The method of claim 9, and further comprising altering each of the plurality of different forms by altering the data model a single time.

11. The method of claim 1, wherein the method renders a plurality of different model driven forms representing a plurality of data models, the method further comprising:

selecting which of a plurality of different logical form types to use to generate the plurality of different model driven forms representing the plurality of data models; and rendering the plurality of different model driven forms, wherein each of the plurality of different model driven forms is generated using one of the plurality of data models and the selected logical form type.

12. The method of claim 11, and further comprising rendering the plurality of different model driven forms at run-time such that the plurality of data models are acted on at run-time.

13. The method of claim 12, and further comprising altering each of the plurality of different user model driven forms by altering the selected logical form type a single time.

14. A computer storage medium having computer-executable instructions stored thereon for performing steps that cause form generation on a user interface that is a component of a computer, the steps comprising:

receiving a selecting input to select which of a variety of different data models and which of a plurality of different logical form types to use to generate a form representing the data model, wherein the logical form types are logical form type models, the selected one of the plurality of different logical form types having multiple defined layouts, with each of the multiple defined layouts specifying how the form representing the data model is to be rendered on different display targets; and rendering the form representing the data model on multiple different display targets using different ones of the multiple defined layouts.

15. The computer storage medium of claim 14, wherein the data model is a business model.

16. The computer storage medium of claim 14, and further having computer-executable instructions for performing a further step of generating at least one logical form at run-time using the data model and the selected logical form type, and rendering the form at run-time using the generated at least one logical form such that the data model is acted on at run-time.

17. The computer storage medium of claim 16, wherein receiving the selecting input to select which of the plurality of different logical form types to use to generate the form further comprises receiving the selecting input to select which of a plurality of different logical form type models to use to generate the form, and wherein generating the form at run-time further comprises generating the form at run-time using both the selected logical form type model and meta data from the data model.

18. The computer storage medium of claim 14, wherein each of the plurality of different logical form types has an associated schema which defines data from the data model to be included in the form.

19. The computer storage medium of claim 18, wherein the schema of each of the plurality of different logical form types represents patterns captured from a plurality of forms.

20. The computer storage medium of claim 14, further having computer-executable instructions for performing further steps comprising:

receiving further selecting inputs to select multiple ones of the plurality of different logical form types to use to generate a plurality of different forms representing the data model; and generating a plurality of different logical forms at run-time, wherein each of the plurality of different logical forms is generated using the data model and a different one of the selected multiple ones of the plurality of different logical form types.

21. The computer storage medium of claim 20, and further having computer-executable instructions for performing the further step of rendering the plurality of different forms at run-time using the corresponding ones of the plurality of generated logical forms such that the data model is acted on at run-time.

22. The computer storage medium of claim 14, wherein the form generation steps generate a plurality of different model driven forms representing a plurality of data models, the computer storage medium further having computer-executable instructions for performing further steps comprising:

receiving the selecting input to select which of the plurality of different logical form types to use to generate the plurality of different forms representing the plurality of data models; and generating a plurality of different logical forms at run-time, wherein each of the plurality of different logical forms is generated using one of the plurality of data models and the selected logical form type.

23. The computer storage medium of claim 22, and further having computer-executable instructions for performing a further step of rendering the plurality of different forms at run-time using the plurality of generated logical forms such that the plurality of data models are acted on at run-time.

* * * * *